United States Patent [19]

Arai et al.

[11] 4,186,557
[45] Feb. 5, 1980

[54] TORQUE CONVERTER WITH NARROWED FLOW PASSAGES

[75] Inventors: Hajime Arai, Aichi; Kiyoshi Oonuma, Toyota, both of Japan

[73] Assignee: Toyota Jidosha Kogyo Kabushiki Kaisha, Toyota, Japan

[21] Appl. No.: 3,869

[22] Filed: Jan. 16, 1979

[30] Foreign Application Priority Data

May 22, 1978 [JP] Japan .................... 53/61266

[51] Int. Cl.² ............... F16D 33/00; F16D 33/20
[52] U.S. Cl. ............................ 60/361; 60/364; 60/367
[58] Field of Search ............... 60/361, 362, 364, 367; 192/3.28

[56] References Cited

U.S. PATENT DOCUMENTS

| | | |
|---|---|---|
| 2,306,758 | 12/1942 | Schneider et al. .......... 60/361 |
| 3,125,857 | 3/1964 | Schneider .................. 60/361 |
| 4,044,556 | 8/1977 | Kuramochi et al. .......... 60/361 |

Primary Examiner—Edgar W. Geoghegan
Attorney, Agent, or Firm—Finnegan, Henderson, Farabow & Garrett

[57] ABSTRACT

A torque converter is proposed where the height of the vanes on at least the turbine wheel is reduced somewhat compared with conventional designs at their middle portions, so that the generation of eddies and turbulence in the flow of transmission fluid past those portions which are the most sharply curved portions of the vanes is avoided.

7 Claims, 4 Drawing Figures

TORQUE CONVERTER WITH NARROWED FLOW PASSAGES

BACKGROUND OF THE INVENTION

The present invention relates to a hydraulic torque converter.

A hydraulic torque converter is one type of device used as a hydraulic transmission for a road vehicle. Normally it is arranged between the engine and the gearbox, and includes an impeller vane wheel attached to the output shaft of the engine, a turbine vane wheel attached to the gearbox input shaft, and a stator vane wheel. All these three are maintained in a bath of transmission fluid, and the turbine vane wheel has a fluid circulation inlet which is disposed directly adjacent to the fluid circulation outlet of the impeller vane wheel and which receives the fluid ejected therefrom. The fluid flow out from the fluid circulation outlet of the turbine vane wheel is received by the fluid circulation inlet of the stator vane wheel, which deflects this flow and supplies it from its fluid circulation outlet back to the fluid circulation inlet of the impeller vane wheel.

The general structure of such a torque converter is that the fluid circulation substantially occurs between two toruses which are coaxial, and one of which is inside the other, the pattern of circulation being rather like that of a smoke ring. In this type of torque converter it has been considered necessary for maintenance of operational efficiency that the velocity component of the circulating fluid in a plane which includes the axis of the torque converter should be constant as the fluid passes round its path. In order to achieve this, a basic design condition of conventional torque converters has been as follows. If we consider a section of the above-mentioned inner and outer toruses by a plane which contains the axis of these two toruses (any plane will do, since the torque converter is cylindrically symmetrical), in this plane the fluid circulates around an annulus defined by an inner closed curve provided by the intersection of the plane and the inner torus and an outer closed curve provided by the intersection of the plane and the outer torus. Considering a circle inscribed between these two curves and touching both of them, the requirement that the velocity component of the fluid in the plane of section should be constant means that the product of the radius of such a circle, and the distance of its center from the axis of the toruses, must be constant for all positions of the circle around the annulus. This condition has always heretofore been maintained as a basic design constraint for torque converters.

However, the present invention derives from the realization that perhaps this condition does not have to be applied strictly. The point is that in an actual torque converter the fluid flow is not altogether in the plane of section as described above. There is a certain amount of deflection of the fluid around the axis of the toruses, caused by the vanes. Consequently, if the conditions within the vane wheels of an actual torque converter are evaluated, the annular shape according to the simple and geometric condition above may require some modification.

Considering a simple vane arrangement as viewed end on, as seen in FIG. 1, if the vanes are of the same thickness throughout their length, it is clear that the width of the fluid passage formed between the vanes, which is expressed by the diameter G of circles inscribed between two adjacent vanes, increases from their inlet portion to their middle portion, and then decreases again from there on to their portion, and in fact this width corresponds to the curvature of the vanes, being greater, the greater is the curvature. When fluid is flowing along this fluid path, being an actual fluid rather than an ideal one, it cannot keep up with the speed changes necessary to maintain its flow in proper correspondence to the varying width of this flow path, and therefore, as illustrated in FIG. 1, in practice turbulence is created at the parts of the flow path which have a tighter curvature, and a loss of efficiency is caused. This problem is in general solved by the thickness of the vanes being made different at different portions, as shown in FIG. 2, so that the flow path formed between the vanes is of constant width. However, if it is desired to manufacture the vanes of the torque converter out of standard steel plate of constant thickness, in view of cheapness and ease of assembly, this solution cannot be adopted.

Now, for a hydraulic torque converter used in a vehicle transmission, the times when it is called upon to transform the torque are substantially limited to the times when the vehicle is either moving off from rest, or accelerating. At other times there is no need to convert or multiply the torque, and it is desirable that as far as possible the operation of the torque converter should be an operation of direct connection, with minimum slipping. That is, it is a desirable characteristic of such a torque converter that in the low-speed driving range a large amount of slipping should occur, and therefore the torque ratio should be comparatively high; while in the high-speed driving range the slipping between the impeller and the turbine should be as small as possible, and hence the torque ratio should approach unity. In accordance with this desirable characteristic, it has been proposed, in U.S. Pat. No. 4,044,556, which was assigned to the same assignee as the present application, to construct a torque converter of a non-conventional shape, wherein this high-speed range slipping is minimized. In this proposed torque converter the slippage at high speed is so low that its operation approaches to direct connection, and therefore, if a lock-up clutch is further incorporated into the system, when this clutch is engaged or disengaged, very little torque shock is caused. Thus the above-identified patent proposes a torque converter which is particularly suitable for use with a lock-up clutch.

The non-conventional shape of the torque converter of the above-identified invention is as follows. Considering the annulus defined by a section by a plane which contains the axis of the two toruses, as defined above, which is delimited by an inner and an outer closed curve, the invention contemplated to provide a torque converter wherein this annulus was compressed in the axial direction, so that the dimension of the outer closed curve in the direction parallel to the axis of the toruses was smaller than its dimension in the direction perpendicular to that axis. Such a torque converter can schematically be seen in FIG. 3. In the above-identified prior patent, the ratio of the axial to the radial dimension of the outer delimiting closed curve is defined as being substantially in the range 0.64–0.8; and, further, the ratio of the distances from the axis of the toruses of the innermost portion of the outer delimiting curve, and of its outermost portion, is defined substantially to be in the range 0.4–0.33; and, finally, the ratio of the total cross-sectional area of the output of the impeller vane wheel (which is an area of an annular shape, in a plane perpendicular to the axis of the toruses) to the area of the circle outlined around the axis of the toruses by the outermost portion of the outer delimiting curve is defined substantially to be in the range 0.18–0.23. In such a torque converter it is found that the slippage rate at high speed is very low, and in fact such a torque converter is particularly suited for use in a transmission which includes a lock-up clutch.

However, it is found that in such a torque converter according to the aforementioned prior invention the lengths of the fluid circulation flow paths within the impeller vane wheel, the turbine vane wheel, and the stator vane wheel are smaller than in a conventional torque converter. Since the angle through which the flow velocity of the fluid has to be altered is the same, this means that the curvature of the vanes must be tighter, particularly at portions of the belowmentioned point B and in its vicinity. Accordingly, the above-outlined problem of turbulence at the portions of the fluid path where the flow direction of the fluid is changing sharply is aggravated.

SUMMARY OF THE INVENTION

The present invention turns its attention to the above-described type of turbulence in the flow in a hydraulic-type torque converter, and seeks to provide a converter in which the occurrence of such turbulence is minimized or altogether averted.

In accordance with the present invention, this object is accomplished by a hydraulic torque converter which comprises an impeller, a stator, and a turbine, each of which is provided with vanes, wherein the space through which fluid circulates is of the form of the space between an inner and an outer torus which are coaxial, wherein a section through the toruses by a plane containing their axis consists of an annulus which is defined by an inner closed curve provided by the intersection of the plane and the inner torus and an outer closed curve provided by the intersection of the plane and the outer torus, wherein the dimension parallel to the axis of the toruses of the outer closed curve is smaller than its dimension in the direction perpendicular to this axis, and wherein, considering a circle inscribed between the inner and outer closed curves and touching both of them and passing round the annulus, the value which is the product of the radius of such a circle and the distance of its center from the axis of the toruses alters, as the center of the circle passes around at least the portion of the annulus which corresponds to the turbine, from a maximum value at the inlet of the turbine to a minimum value which is substantially smaller than this maximum value, so that, for example, said minimum value is approximately in the range of 0.95–0.65 times said maximum value.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DESCRIPTION OF THE PREFERRED EMBODIMENT

Figure 3:
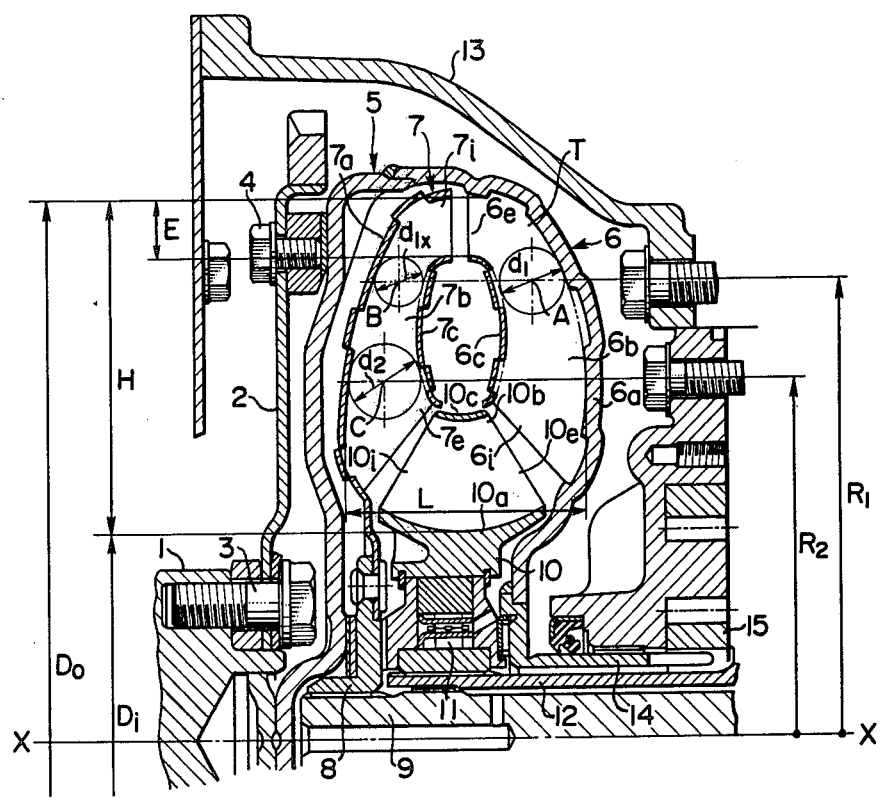
FIG. 3 is a partial longitudinal cross-sectional diagram showing an embodiment of a hydraulic torque converter according to the present invention.

FIG. 3 is a partial longitudinal section, showing an example of an embodiment of a hydraulic torque converter of a flattened type, as particularly proposed in the above-mentioned previous patent, and further employing the present invention. In the figure, 1 designates the engine output shaft end portion to which is fixed a drive plate 2 by bolts 3. This drive plate 2 is coupled by bolts 4 to a housing indicated as a whole by 5. The engine output shaft 1, the drive plate 2, and the housing 5 all rotate as one about the axis X—X. An impeller 6 is formed at the right hand side portion as seen in the drawing of the housing 5, which is the rear portion of it, as it is fitted to the vehicle. The impeller 6 is formed of an outer shell 6a which constitutes a portion of the housing 5, a number of vanes 6b disposed circumferentially around the inside of the outer shell and supported thereby, and an inner shell 6c supported by the vanes. A turbine 7 is provided with its inlet portion 7i disposed in juxtaposition with the outlet portion 6e of the impeller, in front of it. The turbine 7 is composed of an outer shell 7a, a plurality of vanes 7b disposed circumferentially around the inside of this outer shell, and an inner shell 7c supported by these vanes. The outer shell 7a is supported, through a hub member 8, by the turbine shaft 9, and thus the turbine 7 rotates about the same axis X—X as the impeller. A stator 10 is provided between the turbine 7 and the impeller 6 with an inlet portion 10i arranged in juxtaposition with the turbine outlet portion 7e and an outlet portion 10e arranged in juxtaposition with the impeller inlet portion 6i. The stator 10 is again formed of an outer shell 10a, a plurality of vanes 10b disposed circumferentially around the inside of this outer shell, and an inner shell 10c supported by the vanes. The outer shell 10a is supported by a fixed annular shaft 12 through a one-way clutch 11 so that it is free to rotate around the axis X—X in one direction only. 13 designates a housing including the impeller, the stator, and the turbine, and it incorporates an oil pump 15 driven by an annular shaft 14 extending rearwards from the housing 5. The turbine shaft 9 is coupled with the input shaft of a gearbox disposed behind the torque converter to the right in the diagram, which is not shown. Thus the drive is transmitted from the engine to the gearbox.

The impeller 6, turbine 7, and stator 10 form in conjunction a flow path for the transmission fluid which fills the entire torque converter. In this connection, the fluid which is inside the space delimited by the inner shells 6c, 7c, and 10c performs no important flow function, and its movement will hereinafter be ignored. Therefore, the flow path of the transmission fluid is between an inner torus which is defined by the inner shells 6c, 7c, and 10c, and an outer torus which is defined by the outer shells 6a, 7a, and 10a. These toruses are of course coaxial, both having the axis X—X. The circulation of fluid around this flow path is rather like the circulation of a smoke ring, and in the figure, which shows a partial longitudinal section of the toruses by a plane which contains the axis X—X, this circulation is anti-clockwise. That is, the fluid is forced by the impeller 6 out of its outlet 6e and into the inlet 7i of the turbine 7. After flowing through the turbine 7, past its vanes, the fluid leaves the outlet 7e of the turbine and flows into the stator 10 through its inlet 10i. After flowing through the stator, past its vanes, the fluid leaves the stator outlet 10e and enters into the impeller 6 through its inlet 6i. In a conventional torque converter the above-outlined conventional condition for continuous flow demands that, considering the points A, B, and C, which are the centers of circles inscribed inside the annulus T defined by the sections of the toruses by the plane of the paper, if the radii of these circles are d1, d1x, and d2, respectively, and the distances of the points A, B, and C from the axis X—X are respectively R1, R1, and R2.

$$R1 \times d1 = R1 \times d1x = R2 \times d2 = C \text{ (constant)}$$

But, as is clear from the difference between d1 and d1x in FIG. 3, the present invention provides for a construction such that at the point B the width of the annulus T is rather smaller, so that at this portion $R1 \times d1x$ is less than C.

Figure 1:
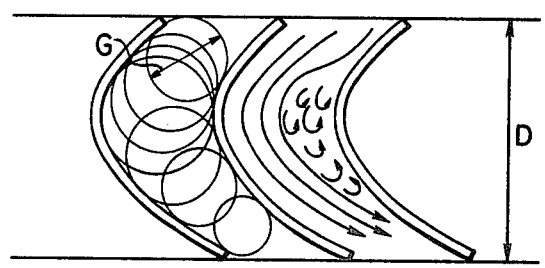
FIG. 1 is a schematic illustration to show two-dimensionally the flow paths outlined by a row of vanes and the change of cross-sectional area within the flow paths, and the accompanying generation of eddies and turbulence.
Figure 2:
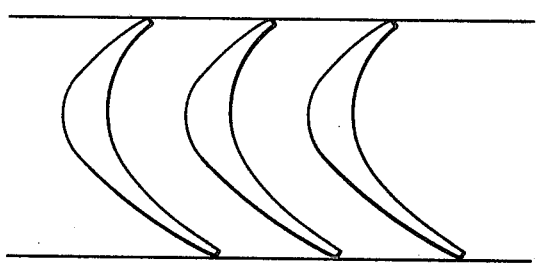
FIG. 2 is a schematic illustration of the same kind as FIG. 1, showing two-dimensionally a row of vanes in which the change in cross-sectional area of the flow paths is removed by making the intermediate portions of the vanes thicker than their end portions.
Figure 4:
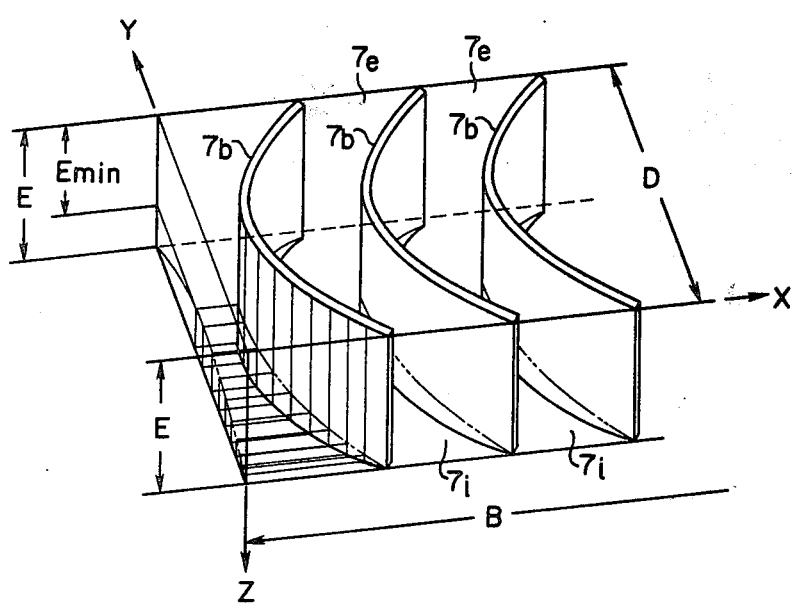
FIG. 4 is a perspective view of an in-plane-developed arrangement of the vanes of the torque converter of the present invention, made for the sake of convenience, illustrating the gist of the present invention.

To make the concept of the present invention more clear, reference should be made to FIG. 4. In this, the arrangement of the vanes is shown in a somewhat distorted manner. The lower X-Y plane in FIG. 4 corresponds to the curved surface of the outer shell 7a, and the upper X-Y plane in FIG. 4 corresponds to the curved surface of the inner shell 7c. Therefore a distortion has been introduced in flattening out these two surfaces. A further distortion is introduced in that the height of the turbine vanes at the inlet portion 7i of the turbine is shown as being the same as their height at the outlet portion 7e of the turbine, but in fact, of course, as is clear from FIG. 3, their height is substantially greater at the portion 7e than at the portion 7i. The vanes as illustrated in FIG. 4 have been normalized in height by being modified from their actual shape so as to incorporate the factor of their distance from the axis of the toruses, which in FIG. 3 is X—X.

It will therefore be apparent that in FIG. 4 the X-axis is parallel to the circumference of circle Do in FIG. 3, the Y-axis is along the curvature of the annulus T in FIG. 3, and the Z-axis is in the direction normal to the outer defining curve of the annulus in FIG. 3. Thus the Y—Z plane in FIG. 4 corresponds to the plane of the paper in FIG. 3, and the shape of the vanes in the Y—Z plane in FIG. 4 corresponds to their shape in the annulus of FIG. 3, distorted as explained above.

According to the above-explained distortion, if the conventional condition is satisfied, the vanes in FIG. 4 will have a rectangular shape, and their height (i.e., their dimension in the Z-direction) will be the same, E, along their length. However, in accordance with the present invention, the height of the vanes in their middle portions is somewhat reduced to Emin, which is substantially in the range of 0.95–0.65 times the value, E, at the inlet portion 7i and the outlet portion 7e. This is expressed schematically, but, transferring this idea back to the actual torque converter shown in FIG. 3, this means that the value which is the product of the radius of a circle inscribed in the annulus T and touching both the inner defining curve and the outer defining curve of the annulus, and the distance of the center of said circle from the axis X—X, is not constant as the said circle moves around the portion of the annulus T which corresponds to the turbine, as in conventional designs of torque converters, but is reduced from a maximum value at the inlet of the turbine, to a minimum value which is substantially in the range of 0.95–0.65 times this maximum value.

As explained above, it is further beneficial to arrange the shape of the vanes so that at their portions which correspond to tighter curving of the flow path of the fluid this aforesaid product of the radius of the circle inscribed in the annulus T and the distance of the center of said circle from the axis X—X is least, and to arrange this value to vary roughly as the radius of curvature of the fluid flow path.

It may also be practiced to apply the construction of the present invention to the vanes of the impeller and/or the stator, as well as to the vanes of the turbine. Generally, however, it is the turbine, rather than the impeller or the stator, which has the shape of a row of vanes which is more prone to generate eddies and turbulence. Hence the present invention is primarily to be considered as to be applied to the turbine.

In the torque converter shown in FIG. 3, the ratio L/H of the axial dimension L and the radial dimension H of the annulus T, the ratio Di/Do of the inner and outer radii of the outer torus, and the ratio a/A of the area a of the total cross-sectional area of the output of the impeller vane wheel to the area of the circle outlined around the axis of the toruses by the outermost portion of the annulus T, are such as to satisfy the conditions proposed in the aforementioned prior patent. In fact, however, research since the date of that application has raised the upper limit on the ratio L/H somewhat, so that this limit is now substantially in the range 0.64–0.87. The ratio Di/Do is substantially to be in the range 0.4–0.33, and the ratio a/A is substantially to be in the range 0.18–0.23. When, with these conditions, is incorporated the above-defined concept of reducing the value which is the product of the radius of the inscribed circle to the annulus T and the distance of the center of said circle from the axis X—X, a torque converter of truly remarkable efficiency results, which is particularly adapted to be used together with a lock-up clutch.

Although the invention has been shown and described with respect to a preferred embodiment thereof, it will be apparent that to one skilled in the art various changes and modifications are possible in the form of the embodiment, without departing from the spirit of the invention, and therefore it is not intended that the scope of the present invention is to be limited by any details of the embodiment shown, or of the drawings, which are given for the purposes of illustration only, but only by the accompanying claims.

We claim:

1. A hydraulic torque converter which comprises an impeller, a stator, and a turbine, each of which is provided with vanes, wherein the space through which fluid circulates is of the form of the space between an inner and an outer torus which are coaxial, wherein a section through the toruses by a plane containing their axis consists of an annulus which is defined by an inner closed curve provided by the intersection of the plane and the inner torus and an outer closed curve provided by the intersection of the plane and the outer torus, wherein the dimension parallel to the axis of the toruses of the outer closed curve is smaller than its dimension in the direction perpendicular to this axis, and wherein, considering a circle inscribed between the inner and outer closed curves and touching both of them and passing round the annulus, the value which is the product of the radius of such a circle and the distance of its center from the axis of the toruses alters, as the center of the circle passes around at least the portion of the annulus which corresponds to the turbine, from a maximum value at the inlet of the turbine to a minimum value which is substantially smaller than this maximum value.

2. The hydraulic torque converter of claim 1, wherein said minimum value is approximately in the range of 0.95–0.65 times said maximum value.

3. The hydraulic torque converter of claim 1, wherein the magnitude of said product corresponds to the magnitude of the transverse space between two adjacent vanes.

4. The hydraulic torque converter of claim 1, wherein said product is smaller at the points where the curvature of the vanes is tighter, and larger where the curvature of the vanes is less tight.

5. The hydraulic torque converter of claim 1, 2, 3, or 4, wherein the ratio of the axial dimension of the annulus to the radial dimension of the annulus is substantially in the range 0.64–0.87, the ratio of the inner and outer radii of the outer torus is substantially in the range of 0.4–0.33, and the ratio of the total cross-sectional area of the output of the impeller to the area of the circle outlined around the axis of the toruses by the outermost portion of the annulus is substantially in the range 0.18–0.23.

6. The hydraulic torque converter of claim 1, 2, 3, or 4, wherein the vanes are of a uniform thickness over their entire length.

7. The hydraulic torque converter of claim 5, wherein the vanes are of a uniform thickness over their entire length.

* * * * *